us 008534653 B2

(12) United States Patent
Huisken et al.

(10) Patent No.: US 8,534,653 B2
(45) Date of Patent: Sep. 17, 2013

(54) METHOD AND FIXTURE FOR HANDLING AND PROCESSING DIE COMPONENTS

(75) Inventors: Richard H. Huisken, Marne, MI (US); Drew H. Boersma, Comstock Park, MI (US)

(73) Assignee: Advanced Tooling Systems, Inc., Comstock Park, MI (US)

( * ) Notice: Subject to any disclaimer, the term of this patent is extended or adjusted under 35 U.S.C. 154(b) by 1026 days.

(21) Appl. No.: 12/544,638

(22) Filed: Aug. 20, 2009

(65) Prior Publication Data

US 2009/0309281 A1    Dec. 17, 2009

Related U.S. Application Data

(62) Division of application No. 11/222,461, filed on Sep. 8, 2005, now Pat. No. 7,618,028.

(51) Int. Cl.
  *B23Q 3/18*    (2006.01)
  *B66F 7/10*    (2006.01)
  *B66F 7/12*    (2006.01)
  *B66F 7/00*    (2006.01)

(52) U.S. Cl.
  USPC ............. 269/63; 464/119; 254/89 H; 187/203

(58) Field of Classification Search
  USPC .................. 269/63; 187/203, 267, 219, 244; 254/89 H, 7 C; 464/136, 119
  See application file for complete search history.

(56) References Cited

U.S. PATENT DOCUMENTS

| 242,959 A | 6/1881 | Naglee | |
|---|---|---|---|
| 341,437 A | 5/1886 | Ernst | |
| 362,082 A | 5/1887 | Holz et al. | |
| 731,870 A | 6/1903 | Echols | |
| 783,031 A * | 2/1905 | Fell | 269/45 |
| 1,120,798 A * | 12/1914 | Duecker | 69/19.3 |
| 1,187,856 A | 6/1916 | Moss | |
| 1,368,085 A * | 2/1921 | Womack | 269/75 |
| 1,386,318 A | 8/1921 | Cowan | |
| 1,408,301 A * | 2/1922 | Jeter | 249/219.1 |
| 1,445,327 A | 2/1923 | Kroeger | |
| 1,498,638 A | 6/1924 | Periolat | |
| 1,914,984 A * | 6/1933 | Smith et al. | 82/117 |
| 1,938,337 A | 12/1933 | Janiszewski | |
| 2,144,486 A | 1/1939 | Erb | |
| 2,341,619 A | 2/1944 | Huss | |
| 2,536,239 A | 1/1951 | Tyndall | |

(Continued)

FOREIGN PATENT DOCUMENTS

JP   403117501   5/1991

*Primary Examiner* — Lee D Wilson
*Assistant Examiner* — Alvin Grant
(74) *Attorney, Agent, or Firm* — Mitchell Intellectual Property Law, PLLC

(57) ABSTRACT

A fixture for machine tools and the like includes a base member and first and second workpiece support units that are movably connected to the base member and define a space therebetween. The fixture includes a drive assembly that is operably connected to the workpiece support units to move the first and second workpiece support units towards and away from one another. The workpiece support units each include a wedge member extending toward the space between the workpiece support units. The wedge members include opposed engagement surfaces that taper towards one another for engaging slots in opposite ends of a workpiece. Each of the workpiece support units also includes a clamp for clamping a workpiece as it engages the wedge members.

10 Claims, 4 Drawing Sheets

(56) References Cited

U.S. PATENT DOCUMENTS

| | | | |
|---|---|---|---|
| 2,574,110 A | 11/1951 | Kopec | |
| 2,596,401 A | 5/1952 | Hines | |
| 2,699,708 A | 1/1955 | Fotsch | |
| 3,053,119 A | 9/1962 | Anderson | |
| 3,153,250 A | 10/1964 | Muehlhauser | |
| 3,218,059 A * | 11/1965 | Andrew | 269/271 |
| 3,275,295 A | 9/1966 | Caldwell et al. | |
| 3,311,006 A * | 3/1967 | Seitter | 82/165 |
| 3,344,695 A | 10/1967 | Hohwart | |
| 3,439,458 A | 4/1969 | Benjamin et al. | |
| 3,593,984 A * | 7/1971 | Carman et al. | 269/1 |
| 3,738,636 A | 6/1973 | Reinke et al. | |
| 3,944,203 A | 3/1976 | Brekelbaum | |
| 4,020,742 A * | 5/1977 | Raymond | 409/218 |
| 4,112,493 A * | 9/1978 | Roch et al. | 700/165 |
| 4,139,189 A * | 2/1979 | Wietrzyk | 269/272 |
| 4,140,306 A | 2/1979 | Wheeler | |
| 4,190,390 A | 2/1980 | Yeates et al. | |
| 4,215,962 A | 8/1980 | Kreucher | |
| 4,340,211 A * | 7/1982 | Chiappetti | 269/110 |
| 4,416,570 A | 11/1983 | Argenbright | |
| 4,448,406 A * | 5/1984 | Hallberg et al. | 269/224 |
| 4,476,654 A * | 10/1984 | Eng et al. | 451/114 |
| 4,502,457 A | 3/1985 | Marron | |
| 4,527,786 A | 7/1985 | Hsu | |
| 4,582,289 A * | 4/1986 | Gibson et al. | 248/550 |
| 4,592,541 A * | 6/1986 | Huray | 269/155 |
| 4,604,923 A * | 8/1986 | Link et al. | 82/1.11 |
| 4,624,081 A | 11/1986 | Janutta | |
| 4,647,028 A * | 3/1987 | Yang | 269/139 |
| 4,685,663 A * | 8/1987 | Jorgensen | 269/244 |
| 4,736,934 A * | 4/1988 | Grech | 269/110 |
| 4,821,393 A | 4/1989 | Spigarelli | |
| 5,065,811 A | 11/1991 | Scholz et al. | |
| 5,146,961 A * | 9/1992 | Schoeller | 144/3.1 |
| 5,150,887 A * | 9/1992 | Weissenborn et al. | 269/71 |
| 5,172,896 A | 12/1992 | Beere | |
| 5,190,271 A * | 3/1993 | Otterbein, II | 269/91 |
| 5,230,183 A * | 7/1993 | Wagner, Jr. | 451/365 |
| 5,269,340 A * | 12/1993 | Drzewiecki | 137/318 |
| 5,342,031 A * | 8/1994 | Yu-Fang | 269/134 |
| 5,344,264 A * | 9/1994 | Hevoyan | 409/235 |
| 5,647,704 A | 7/1997 | Turcham | |
| 5,816,568 A | 10/1998 | Fox | |
| 5,950,998 A * | 9/1999 | Crabb | 269/98 |
| 6,068,541 A | 5/2000 | Dwyer | |
| 6,112,783 A * | 9/2000 | Newman | 144/144.52 |
| 6,186,867 B1 | 2/2001 | Dwyer | |
| 6,338,477 B1 * | 1/2002 | Moore | 269/60 |
| 6,652,369 B2 | 11/2003 | Jones et al. | |
| 6,688,569 B1 * | 2/2004 | Weiss | 248/229.15 |
| 7,159,496 B2 * | 1/2007 | Maes | 83/452 |
| 7,618,028 B2 * | 11/2009 | Huisken et al. | 269/63 |
| 7,857,296 B2 * | 12/2010 | Lu et al. | 269/315 |
| 8,210,510 B2 * | 7/2012 | Li et al. | 269/246 |
| 8,226,074 B1 * | 7/2012 | Hughey | 269/155 |
| 2003/0123944 A1 | 7/2003 | Lanvin | |
| 2005/0091846 A1 | 5/2005 | Powers et al. | |
| 2009/0165247 A1 * | 7/2009 | Lu et al. | 16/337 |

\* cited by examiner

METHOD AND FIXTURE FOR HANDLING AND PROCESSING DIE COMPONENTS

This is a divisional of application Ser. No. 11/222,461, filed Sep. 8, 2005.

BACKGROUND OF THE INVENTION

Dies utilized for fabricating sheet metal parts and the like typically include a die set having a pair of die shoes (e.g., flat metal plates) that are movably interconnected by posts and bushings that provide for movement of the die shoes towards and away from one another, and align and position the die shoes relative to one another. A variety of punches, die steels and the like are mounted to the die shoes for forming parts from sheet metal as it is fed into the die. A number of openings are typically machined into the die shoe for mounting of the die steel and other such components, and also to provide clearance for slugs that are punched from the sheet metal and pass through openings in the lower die shoe during the forming process.

Dies are often provided with parallels for mounting the die shoes to a press. In general, parallels are elongated heavy steel members with opposite edge surfaces that are machined to parallel so the parallel can position and provide support for the die in the press. The parallels typically include a plurality of threaded openings that receive threaded fasteners for securing the parallels to the die shoes. The die shoes may also include slots or openings at end portions of the parallels to provide for securing the parallel to the press. Depending upon the requirements of a particular die design, parallels may be positioned adjacent or across a slug clearance opening in the die shoe, such that clearance must be machined in the parallel to provide for proper exit of the slugs. Due to the wide variation in the size and configuration of dies, parallels are typically custom made for a particular die. Parallels are commonly rough cut from large plates of hot roll steel using a flame cutter. The rough cut parallels were then individually machined utilizing conventional manual workpiece setup and positioning methods. As a result of the time consuming manual setup and positioning, such machining methods can be costly due to the amount of labor and machine time used.

Accordingly, a way to reduce the setup and machining time would be desirable.

SUMMARY OF THE INVENTION

The present invention comprises a method and fixture for handling and processing die components. One aspect of the present invention comprises use of a fixture for machine tools including a base member and first and second workpiece support units that are movably connected to the base member, the first and second workpiece units defining a space therebetween. The fixture further includes a drive assembly that is operably connected to the first and second workpiece support units. The drive assembly is operable to move the first and second workpiece support units towards one another and away from one another. The first and second workpiece support units each include a wedge member extending toward the space between the first and second workpiece support units. The wedge members include opposed engagement surfaces that taper towards one another for engagement of slots in a workpiece, i.e. a die component. The first and second workpiece support units further include a clamp having a pair of movable jaw members positioned adjacent the wedge member for clamping a workpiece as it engages the wedge members.

In another aspect of the invention, die component steel plates are provided with flame cut die processing features such as the aforesaid processing slots, notches and apertures, preferably at the time the component is flame cut from large plates of hot roll steel, which have nothing to do with the ultimate functionality of the die, but rather are made to facilitate handling, locating and/or holding the plate or items to be mounted on the plate during the process of die manufacture. By flame cutting such processing features into the hot roll steel plate when it is flame cut, the expense of tedious positioning, clamping and possibly even subsequent machining for processing purposes only is eliminated.

Another aspect of the present invention comprises use of a fixture for machine tools including a base member and first and second workpiece support units that are movably connected to the base member for movement towards and away from each other. Each workpiece support unit includes a unit base structure and a wedge member that is rotatably mounted to the unit base structure for rotating a workpiece supported on the wedge members between the first and second workpiece support units. The fixture further includes a drive assembly operably connected to the first and second workpiece support units and simultaneously moving the first and second workpiece support units towards and away from each other.

Another aspect of the present invention comprises use of a fixture for machine tools including a base member and first and second workpiece support units mounted to the base member. Each workpiece support unit includes a unit base structure and an attachment structure rotatably mounted to the base structure. Each attachment structure is configured to hold a workpiece for rotation in the fixture. Each workpiece support unit also includes an indexing device that selectively retains the attachment structure at a selected one of a plurality of predetermined angular positions relative to the unit base structure. The fixture further includes a mechanical drive assembly operably interconnecting the attachment structures. The mechanical drive assembly simultaneously moves the attachment structures towards and away from one another.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
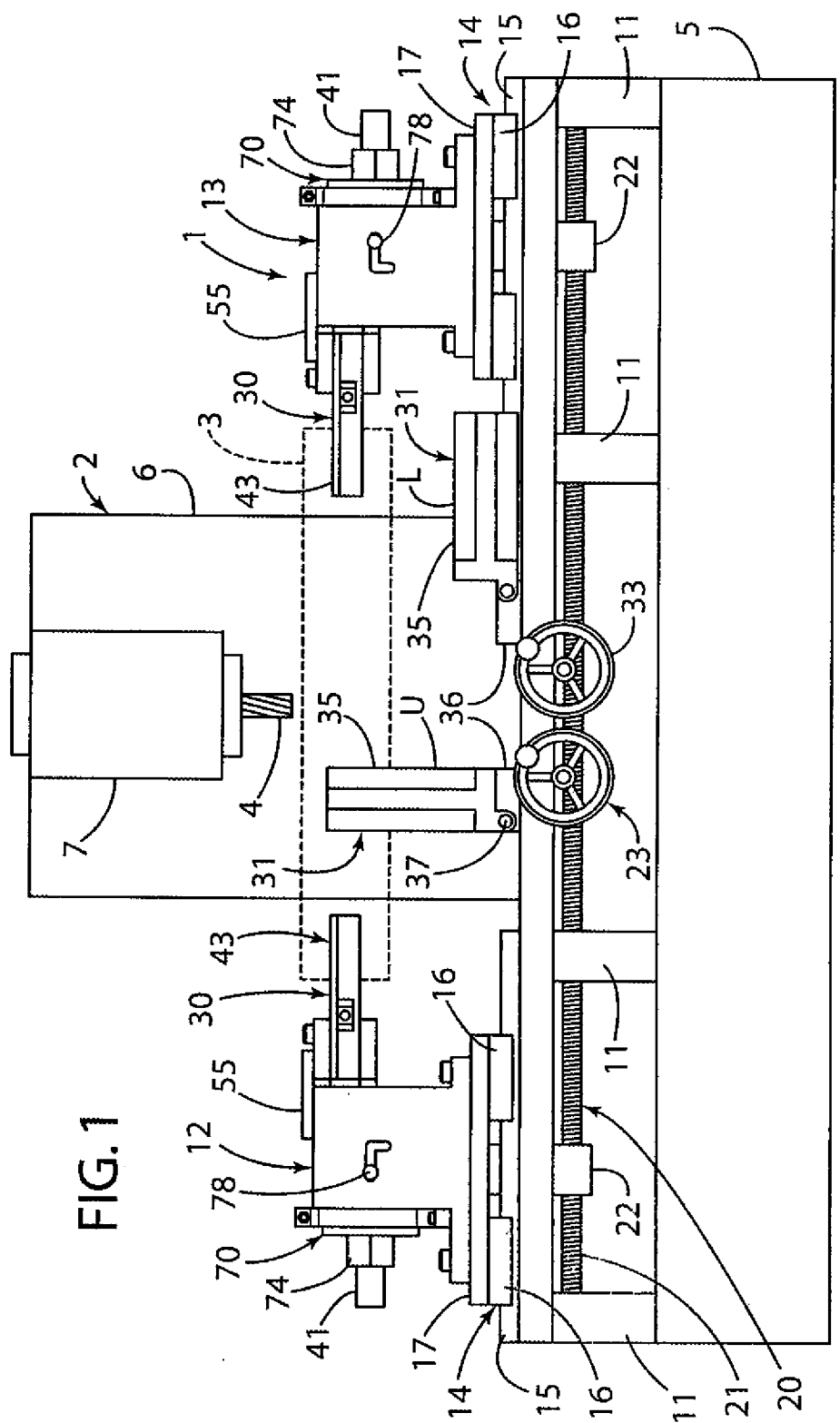
FIG. 1 is a partially schematic elevational view of a machine tool and fixture according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
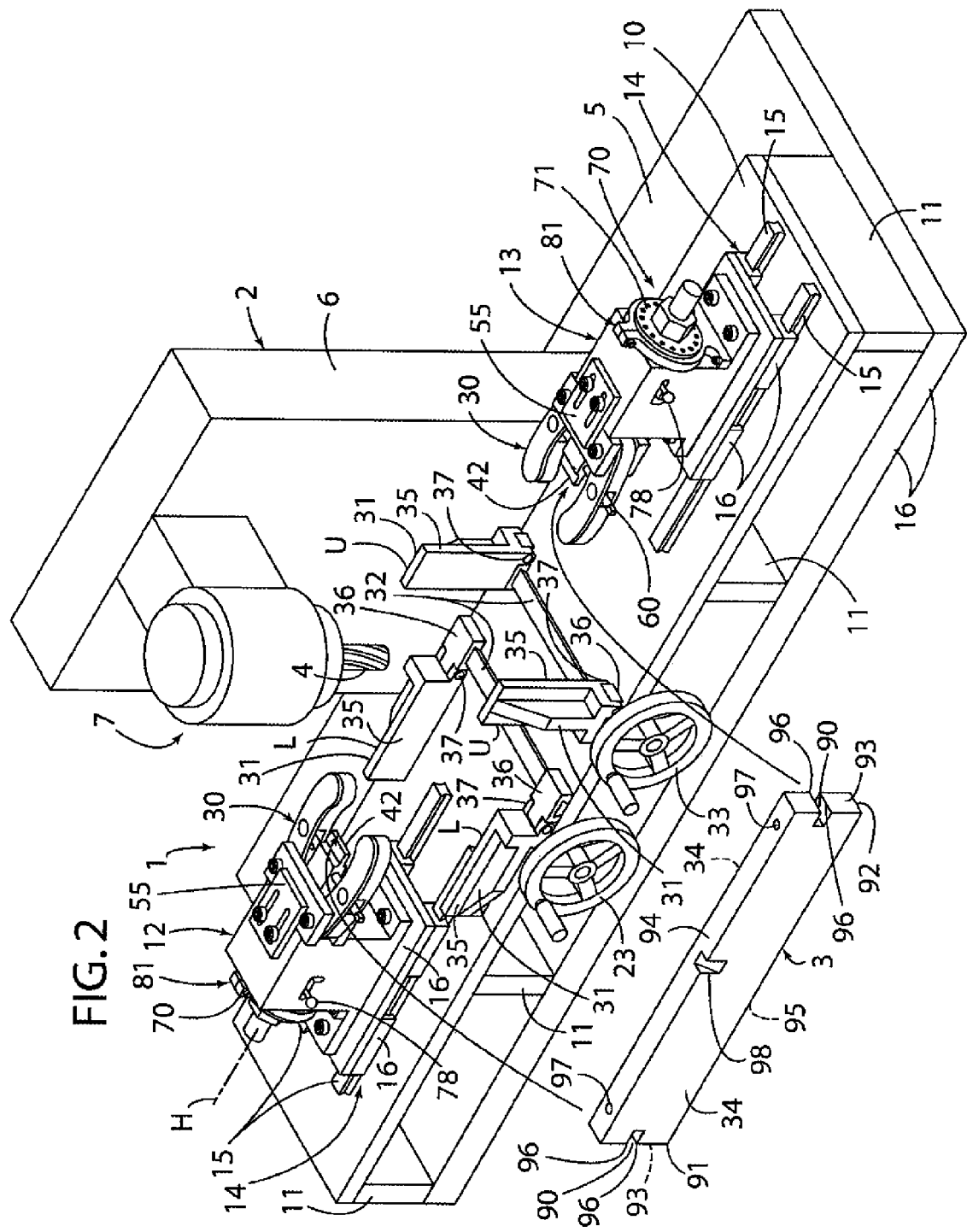
FIG. 2 is a partially schematic perspective view of the machine tool and fixture of FIG. 1.

With reference to FIGS. 1 and 2, a fixture 1 according to one aspect of the present invention may be mounted to a machine tool 2 to support a workpiece such as a parallel during machining operations. In the illustrated example, the machine tool 2 comprises a milling machine of a known type including a bed 5, vertical structure 6, and a head 7 to which a variety of cutters 4, drill bits, reamers, or the like may be attached for machining operations. In the illustrated example, the machine tool 2 is a CNC machine having a computer control system to control the machining operations.

Fixture 1 includes first and second workpiece support units 12 and 13, respectively, that securely hold and position a workpiece such as a parallel 3 during machining operations. As discussed in more detail below, workpiece support units 12 and 13 include wedge members 42 that engage slots or notches 90 that are pre-formed in the opposite ends 91, 92 of a rough-cut parallel 3. Workpiece support units 12, 13 also include clamps 43 with jaws 44 that clamp onto opposite side surfaces 34 of parallel 3. The workpiece support units 12 and 13 provide for rotation of the parallel 3 about a horizontal axis without disengaging wedge members 42 and clamps 43, such that the position of parallel 3 relative to milling machine 2 remains known, and time-consuming manual setup and repositioning of parallel 3 is not required.

The fixture 1 includes a base 10 that is secured to the bed 5 utilizing a plurality of support blocks 11 and conventional "strap" clamps (not shown) or the like. In general, the fixture 1 may be secured to a machine tool in any suitable manner, depending upon the particular application. Also, it will be understood that the fixture 1 may be utilized with a wide variety of known machine tools. The CNC milling machine 2 is illustrated in a partially schematic manner to facilitate understanding of the use of fixture 1, but the CNC milling machine 2 is not, per se, a novel part of the present invention. The fixture 1 includes a first workpiece support unit 12 and a second workpiece support unit 13. The first and second workpiece support units 12 and 13, respectively, are slidably mounted to the base 10 via linear guides 14 comprising a plurality of rails 15 that are secured to the base, and pillow or slide blocks 16. A drive assembly 20 includes an elongated threaded member 21 extending between the first and second workpiece support units 12 and 13, respectively. The workpiece support units 12 and 13 each include a threaded member 22 threadably engaging the elongated threaded member 21. The threads on the elongated thread member 21 and threaded members 22 is configured such that rotation of elongated threaded member 21 in a given direction simultaneously moves the first and second support units 12 and 13, respectively, towards and away from each other. A handle 23 is rotatably mounted to the fixture, and includes a gear mechanism (not shown) or the like of a known type that causes the elongated threaded member 21 to rotate upon rotation of handle 23. Due to the simultaneous movement of workpiece support units 12 and 13, a parallel 3 or other workpiece is automatically centered in fixture 1 when wedge members 42 are shifted into engagement with slots 90 upon rotation of handle 23 when parallel 3 is loaded into fixture 1.

In addition to wedge members 42 and clamps 43, fixture 1 also includes a plurality of brackets 31 that may be utilized to further support a parallel 3 in fixture 1. Brackets 31 are movably mounted to the base 10 via guides such as transverse rails 32. A handle 33 is rotatably mounted to the base 10, and is operably connected to the brackets 31 by a drive assembly (not shown) of a known type that is similar to the drive assembly 20 described in more detail above. Rotation of handle 33 causes the brackets 31 to simultaneously move towards and away from each other. The brackets 31 can be clamped to the sides 34 of a workpiece 3 to provide additional support if necessary to prevent vibration or the like during the machining process. Each bracket 31 includes an upwardly extending bracket member 35 that is pivotably mounted to a base bracket member 36 via a pin 37. The upper bracket member 35 can be pivoted to a lowered position L as shown in FIGS. 1 and 2 to facilitate loading of a workpiece 3 in the fixture 1. Also, the upper bracket members 35 may be positioned in the lower position L if extra support is not required during the machining of a particular workpiece. Alternately, the upper bracket members 31 may be pivoted to the upper position U and utilized to clamp a workpiece 3 as described above.

Figure 3:
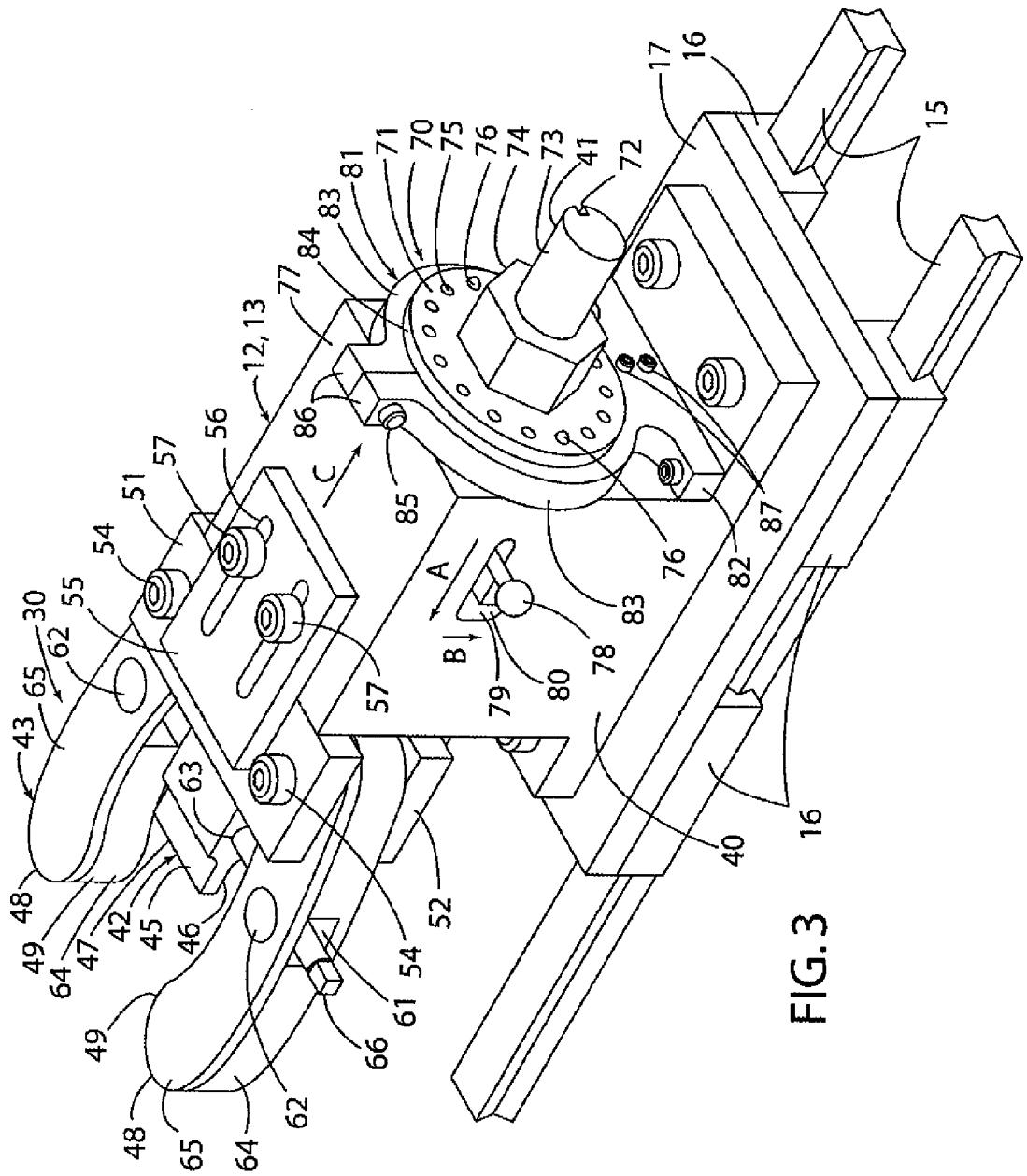
FIG. 3 is a perspective view of a workpiece support unit of the fixture of FIG. 1.
Figure 4:
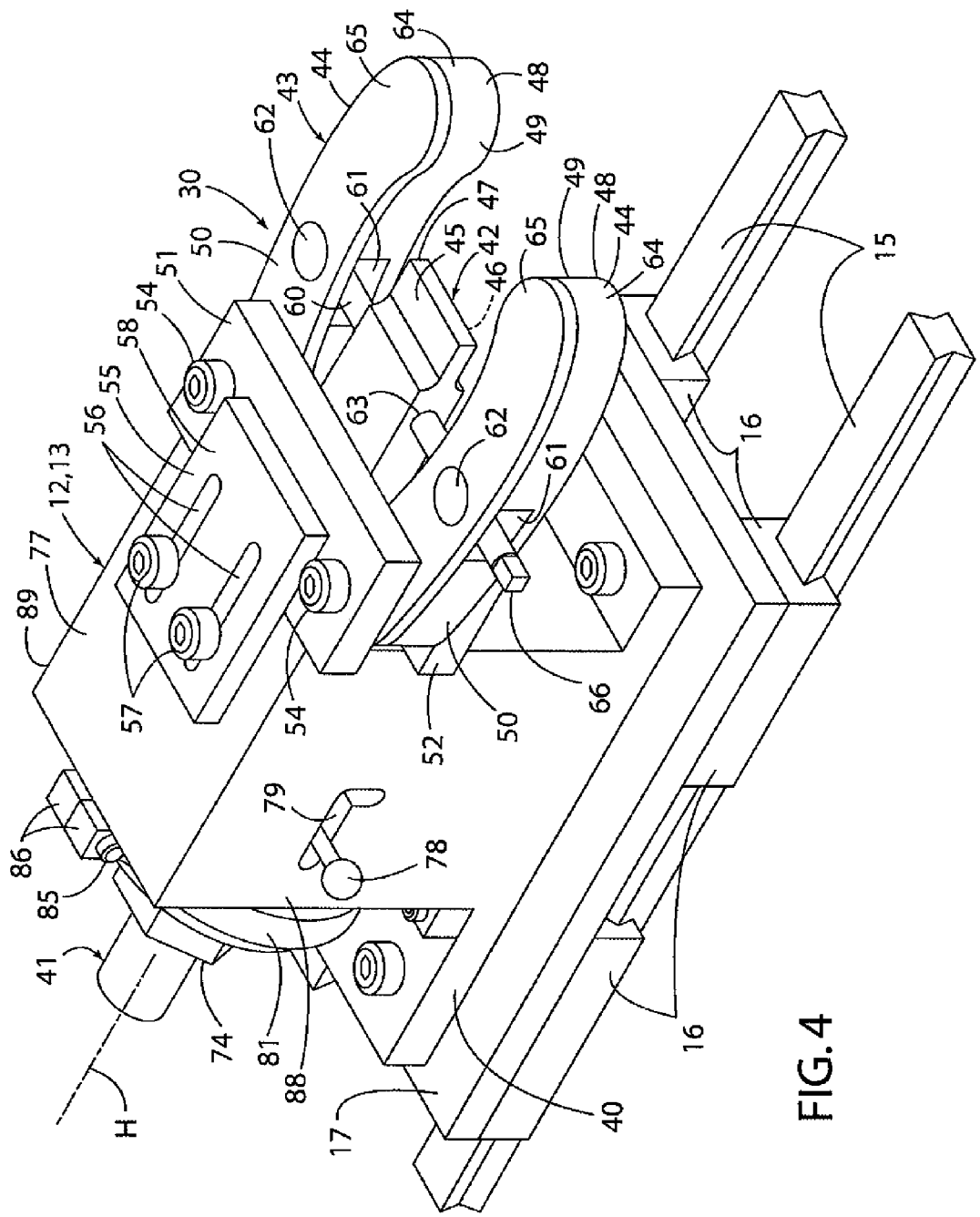
FIG. 4 is a perspective view of a workpiece support unit of the fixture of FIG. 1.

With further reference to FIGS. 3 and 4, the workpiece support units 12, 13 each include a unit base structure 40, and a workpiece support accessory 30 including a wedge member 42 and clamp 43. Workpiece support accessory 30 is rotatably mounted to the unit base structure 40 via a shaft 41 or the like. The workpiece support units 12 and 13 include a block 77 that is secured to a plate 17, and pillow blocks 16 are, in turn, secured to the plate 17.

Wedge members 42 include opposed tapered surfaces 45 and 46 that extend towards one another adjacent the end 47 of wedge members 42. The jaws 44 of clamp 43 include outer ends 48 and clamping surfaces 49 adjacent the outer ends 48 that extend inwardly, forming a smooth radius. The radiused surface portions 49 ensure that the jaws 44 securely clamp a workpiece positioned in the workpiece support accessory, despite variations in the thicknesses of different workpieces. Inner ends 50 of jaws 44 are pivotably connected to plates 51 and 52 via carriage bolts 54, pins or the like. A threaded rod 60 extends through clearance openings 61 in jaws 43, and threadably engages pins 62. Threaded rod 60 passes through a clearance opening or bushing 63 in wedge member 42. In the illustrated example, the jaws 44 include a main jaw member 64 and a plate member 65 that closes off clearance openings 61 in main jaw members 64. Threaded rod 60 includes an end 66 having flat surfaces or the like to thereby enable a user to rotate the threaded rod 60 to draw the jaws 44 towards and away from one another utilizing a wrench or the like. The plates 51 and 52 are secured to the shaft 41, and the wedge member 42 is also secured to the shaft 41, such that the clamp 43 and wedge member 42 can be simultaneously rotated together relative to the unit base structure 40 to rotate a parallel 3. A retainer plate 55 includes a pair of elongated slots 56 that receive threaded fasteners 57. The end portion 58 of retainer plate 55 can be positioned to overlap the plate 51. The threaded fastener 57 can then be tightened, thereby locking the plate 51 in a horizontal position, with wedge member 42 in the position illustrated in FIGS. 3 and 4. The retainer plate 55 also retains the jaws 44 of clamp 43 in the position illustrated in FIGS. 3 and 4.

The first and second workpiece support units 12 and 13 also include an indexing mechanism 70 (FIGS. 3, 4). The indexing mechanism 70 is utilized to selectively lock the workpiece support accessory 30 at a preselected one of a plurality of predetermined angular positions for machining angled clearance notches 98 (FIG. 1) or the like in parallel 3. Indexing mechanism 70 includes an index wheel 71 that is fixed to the shaft 41 via a key or the like (not shown) that engages keyway 72 in shaft 41, and a corresponding key way (not shown) in indexing wheel 71. The end portion 73 of shaft 41 is threaded, and a threaded fastener 74 is threadably received on the shaft 41 to thereby retain the index wheel 71. The indexing wheel 71 includes a plurality of openings 75 that extend around the indexing wheel 71 in a circular pattern. A pair of pins 76 are slidably mounted in a block 77 of unit base structure 40 adjacent opposite sides 88, 89 of block 77. Pins 76 are operably connected to handles 78 that are received within L-shaped openings 79 on the opposite sides 88 and 89 of block 77. Handles 78 can be shifted in the direction of the arrow "A" (FIG. 3) to retract pins 76 from an opening 75 in index wheel 71. Handles 78 and pins 76 are biased by a spring or the like (not shown) into the engaged position (i.e., the direction opposite arrow "A"). Handles 78 can be shifted in the direction of the arrow "B" into the end 80 of L-shaped slots 79 to thereby retain the pins 76 in the retracted position for rotation of index wheel 71 and the workpiece support accessory 30. The openings 75 in index wheel 71 are preferably spaced at equal angular intervals to thereby position the workpiece support accessory 30 and the workpiece 3 at a known angular position. In the illustrated example, the openings 75 are positioned at 22.5° intervals relative to one another. As discussed above, retainer plate 55 may be utilized to retain the wedge member 42 and clamp 43 in the horizontal position. If the workpiece 3 is to be rotated in fixture 1, the fasteners 57 are loosened, and the retainer plate 55 is shifted in the direction of the arrow "C" (FIG. 3) such that the end portion 58 of plate 55 does not overlap plate 51, thereby permitting rotation of wedge member 42 and clamp 43. The indexing device 70 also includes a retaining clamp 81 having a base portion 82 and a pair of C-shaped arms 83 that extend upwardly around the outer peripheral surface 84 of index wheel 71. A threaded fastener 85 extends through the end portions 86 of C-shaped arms 83. The threaded fastener 85 can be loosened to permit rotation of index wheel 71 to the desired position. The pin 76 can then be engaged with the selected opening 75 utilizing handles 78. The threaded fastener 85 can then be tightened to thereby clamp onto the indexing wheel 71. The retaining clamp 81 is secured to the block 77 via threaded fasteners 87 or the like, such that the retaining clamp 81 prevents rotation of index wheel 71 relative to the block 77 when threaded fastener 85 is tightened.

With reference back to FIG. 2, in use a workpiece such as a parallel 3 is loaded into the fixture 1 prior to machining. The parallel 3 includes notches 90 at the opposite ends 91 and 92 of parallel 3. The parallel 3 may be made from hot roll steel or the like, and the parallel 3 is initially rough cut with a flame cutter or the like from a large plate of steel. The notches 90 are cut into the parallel 3 at the time the parallel 3 is cut from a plate of steel, so the rough-cut parallel can be secured in fixture 1 without additional machining. The flame cutting process produces relatively rough and imprecise end surfaces 93, and upper and lower surfaces 94 and 95. Also, the surfaces forming notches 90 are also relatively rough and imprecise as a result of the flame cutting process.

The parallel 3 is initially positioned between the first and second workpiece support units 12 and 13, respectively. The handle 23 is then rotated to draw the workpiece support units 12 and 13 towards one another. The parallel 3 is positioned with notches 90 in alignment with wedge members 42, and wedge members 42 enter the notches 90 as the workpiece support units 12 and 13 are drawn together. The tapered surfaces 45 and 46 of wedge members 42 engage notches 90, typically at corners 96, to thereby support and center the parallel 3. The clamps 30 are then tightened utilizing a wrench or the like to rotate the threaded members 60. In this way, the parallel 3 is rigidly secured in the fixture 1. Because workpiece support units 12 and 13 simultaneously move towards one another at the same rate, the parallel 3 is automatically centered relative to opposite ends 91 and 92 of parallel 3 in fixture 1 as wedge members 42 engage notches 90. Also, jaws 44 contact opposite sides 34 of parallel 3 and thereby center parallel 3 in fixture 1 relative to sides 34.

If required, the upper bracket members 35 may be positioned in the upright position "U", and handle 33 may then be rotated to clamp onto the opposite sides 34 of parallel 3 to further support the parallel 3 in fixture 1. The surface 94 of parallel 3 may then be machined flat, and a number of features such as threaded openings 97 may also be machined. The retainer plates 55 and clamp 81 may then be loosened, and handles 78 are also shifted to retract the retainer pins 76 from index wheels 71 to rotate the parallel 3 about axis "H" to a desired angular position. One or more clearance notches or ramps 98 may then be machined at an angle in the parallel 3 to provide for exit of slugs and the like, or to provide clearance for other components or the like.

As discussed above, the wedge members 42 and clamps 43 center the parallel 3 on the fixture 1, such that the position and orientation of the various openings 97, clearance notches 98, and/or other machined features are precisely located relative to one another. After machining the upper surface 94, the parallel 3 can be rotated 180° in fixture 1, and the surface 95 may then be machined parallel to the surface 94. If additional features need to be machined into surface 95, such features can be accurately positioned relative to each other, and relative to the surface 94 and other machined features associated with surface 94.

The fixture 1 does not require the time-consuming manual setup procedures associated with conventional machining operations. The wedges 42 and clamps 43 quickly center a workpiece in the fixture 1, and securely hold the workpiece for machining. Because the workpiece does not move relative to the wedges 42 and clamps 43, the workpiece can be rotated to provide for accurate machining on opposite sides of the workpiece without manually measuring and locating the workpiece.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A fixture for machine tools, comprising:
a base member;
first and second workpiece support units movably connected to the base member and defining a space therebetween;
a drive assembly operably connected to the first and second workpiece support units, the drive assembly operable to move the first and second workpiece support units towards and away from one another; and wherein:
the first and second workpiece support units each include a workpiece engaging member extending toward the space between the first and second workpiece support units, for engagement of locating features in a workpiece, each of the first and second workpiece support units further including a clamp having a pair of moveable jaw members positioned adjacent the workpiece engaging member for clamping a workpiece as it is engaged by the workpiece engaging members, wherein:
the first and second workpiece support units each include a unit base structure, and wherein:
the workpiece engaging members and the moveable jaw;

members comprise rotating assemblies that are rotatably mounted to the unit base structures and permit rotation of a workpiece about a horizontal axis.

2. The fixture for machine tools of claim 1, wherein each workpiece support unit includes an indexing device that retains the rotating assembly at a selected one of a plurality of predetermined angular discrete positions relative to the unit base structure.

3. The fixture for machine tools of claim 2, wherein:
the rotating assemblies include a shaft that rotatably mounts the rotating assemblies to the unit base structure;
the indexing device comprises a retaining member fixed to the shaft and including a plurality of openings forming a circular pattern around the shaft, the indexing devices further comprising pins movably mounted to the unit base structures and selectively engaging the openings to secure the rotating assembly at a predetermined angular position.

4. A fixture for machine tools, comprising:
a base member;
first and second workpiece support units movably connected to the base member and defining a space therebetween;
a drive assembly operably connected to the first and second workpiece support units, the drive assembly operable to move the first and second workpiece support units towards and away from one another; and wherein:
the first and second workpiece support units each include a workpiece engaging member extending toward the space between the first and second workpiece support units, for engagement of locating features in a workpiece, each of the first and second workpiece support units further including a clamp having a pair of moveable jaw members positioned adjacent the workpiece engaging member for clamping a workpiece as it is engaged by the workpiece engaging members, wherein:
the movable jaw members define outer end portions and inner end portions, and wherein the inner end portions of the movable jaw members are pivotably mounted to the first and second workpiece support units.

5. The fixture for machine tools of claim 4, wherein:
the inner end portions are spaced-apart, and wherein the workpiece engaging members are positioned between the movable jaw members of each pair of the movable jaw members adjacent the inner end portions thereof.

6. The fixture for machine tools of claim 5, wherein:
each clamp includes a threaded clamp member extending between the movable jaw members and operably engaging the movable jaw members such that rotation of the threaded clamp members shifts the movable jaw members towards and way from each other.

7. The fixture for machine tools of claim 5, wherein:
said workpiece engaging members have engagement surfaces which include generally planar portions.

8. The fixture for machine tools of claim 5, wherein:
each workpiece engaging member defines a central plane, and includes engagement surfaces which are symmetrical about the central plane.

9. A fixture for machine tools, comprising:
a base member;
first and second workpiece support units movably connected to the base member for movement towards and away from each other, each workpiece support unit including a unit base structure and a wedge member rotatably mounted to the unit base structure for rotating a workpiece supported on the wedge members between the first and second workpiece support units;
each workpiece support unit includes a clamp having a pair of moveable jaws adjacent the workpiece engaging members, wherein the jaws are rotatably mounted to the unit base structures and rotate with the workpiece engaging members;
a drive assembly operably connected to the first and second workpiece support units and simultaneously moving the first and second workpiece support units towards and away from each other.

10. A fixture for machine tools, comprising:
a base member;
first and second workpiece support units movably connected to the base member and defining a space therebetween;
a drive assembly operably connected to the first and second workpiece support units, the drive assembly operable to move the first and second workpiece support units towards and away from one another; and wherein:
the first and second workpiece support units each include a workpiece engaging member extending toward the space between the first and second workpiece support units, for engagement of locating features in a workpiece, each of the first and second workpiece support units further including a clamp having a pair of moveable jaw members positioned adjacent the workpiece engaging member for clamping a workpiece as it is engaged by the workpiece engaging members, wherein each workpiece support unit includes indexing device that retains the rotating assembly at a selected one of a plurality of predetermined angular discrete positions relative to the unit base structure.

* * * * *

UNITED STATES PATENT AND TRADEMARK OFFICE
CERTIFICATE OF CORRECTION

| | | |
|---|---|---|
| PATENT NO. | : 8,534,653 B2 | Page 1 of 1 |
| APPLICATION NO. | : 12/544638 | |
| DATED | : September 17, 2013 | |
| INVENTOR(S) | : Huisken et al. | |

It is certified that error appears in the above-identified patent and that said Letters Patent is hereby corrected as shown below:

In the Claims:

Col. 8, claim 9, line 14:

"wedge member" should be --workpiece engaging member--

Col. 8, claim 9, line 17:

"on the wedge members" should be --by the workpiece engaging members--

Signed and Sealed this
Eleventh Day of March, 2014

Michelle K. Lee
*Deputy Director of the United States Patent and Trademark Office*